(12) United States Patent
Hiro et al.

(10) Patent No.: US 12,164,213 B2
(45) Date of Patent: Dec. 10, 2024

(54) IMAGING DEVICE AND CONTROL METHOD

(71) Applicant: SONY GROUP CORPORATION, Tokyo (JP)

(72) Inventors: Daisuke Hiro, Tokyo (JP); Hiroshi Takagi, Tokyo (JP); Yasunori Sugawara, Tokyo (JP); Kengo Takano, Tokyo (JP); Katsunari Oda, Tokyo (JP); Jun Torobu, Tokyo (JP); Jumpei Kimura, Tokyo (JP); Hiroaki Minami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 225 days.

(21) Appl. No.: 17/756,936

(22) PCT Filed: Dec. 2, 2020

(86) PCT No.: PCT/JP2020/044799
§ 371 (c)(1),
(2) Date: Jun. 6, 2022

(87) PCT Pub. No.: WO2021/124884
PCT Pub. Date: Jun. 24, 2021

(65) Prior Publication Data
US 2023/0009731 A1 Jan. 12, 2023

(30) Foreign Application Priority Data
Dec. 16, 2019 (JP) .................................. 2019-226864

(51) Int. Cl.
*G03B 15/05* (2021.01)
*H04N 23/56* (2023.01)

(52) U.S. Cl.
CPC ............. *G03B 15/05* (2013.01); *H04N 23/56* (2023.01)

(58) Field of Classification Search
None
See application file for complete search history.

(56) References Cited

U.S. PATENT DOCUMENTS 8,854,536 B2 * 10/2014 Ogasawara ............ G03B 15/05
348/211.3
10,264,169 B2 * 4/2019 Leip ....................... H04N 23/56
(Continued)

FOREIGN PATENT DOCUMENTS

CN 102377478 A 3/2012
CN 106469128 A 3/2017
(Continued)

OTHER PUBLICATIONS

International Search Report and Written Opinion of PCT Application No. PCT/JP2020/044799, issued on Feb. 22, 2021, 09 pages of ISRWO.

*Primary Examiner* — Clayton E. LaBalle
*Assistant Examiner* — Diana Hancock
(74) *Attorney, Agent, or Firm* — CHIP LAW GROUP

(57) ABSTRACT

The present disclosure relates to an imaging device, a control method, and a program that make it possible to cope with various cases in which a plurality of communication standards is assumed to be mixed. A communication unit performs communication according to a first communication standard and a second communication standard. A communication compatibility processing unit performs communication compatibility processing necessary for maintaining communication compatibility in a case where an imaging system is assumed, the imaging system mixedly including a first external flash supporting only the first communication standard and a second external flash supporting both the first (Continued)

communication standard and the second communication standard. The present technology can be applied to, for example, an imaging system including an imaging device and an external flash.

11 Claims, 10 Drawing Sheets

(56) References Cited

U.S. PATENT DOCUMENTS

| | | | | |
|---|---|---|---|---|
| 2004/0240868 | A1* | 12/2004 | Iwasaki | G03B 7/17 396/182 |
| 2008/0106630 | A1* | 5/2008 | Matsuda | H04N 23/56 348/E5.029 |
| 2010/0202767 | A1* | 8/2010 | Shirakawa | G03B 15/05 396/56 |
| 2012/0044371 | A1* | 2/2012 | King | H04N 23/56 348/E5.043 |
| 2012/0046761 | A1* | 2/2012 | Ichikawa | G03B 15/02 700/14 |
| 2017/0052797 | A1* | 2/2017 | Shu | H04N 23/663 |
| 2022/0408007 | A1* | 12/2022 | Yana | H04N 23/663 |
| 2022/0417412 | A1* | 12/2022 | Sugawara | H04N 23/663 |

FOREIGN PATENT DOCUMENTS

| | | |
|---|---|---|
| JP | 2006-064763 A | 3/2006 |
| JP | 2009-058545 A | 3/2009 |
| JP | 2012-044629 A | 3/2012 |
| JP | 2017-041833 A | 2/2017 |

* cited by examiner

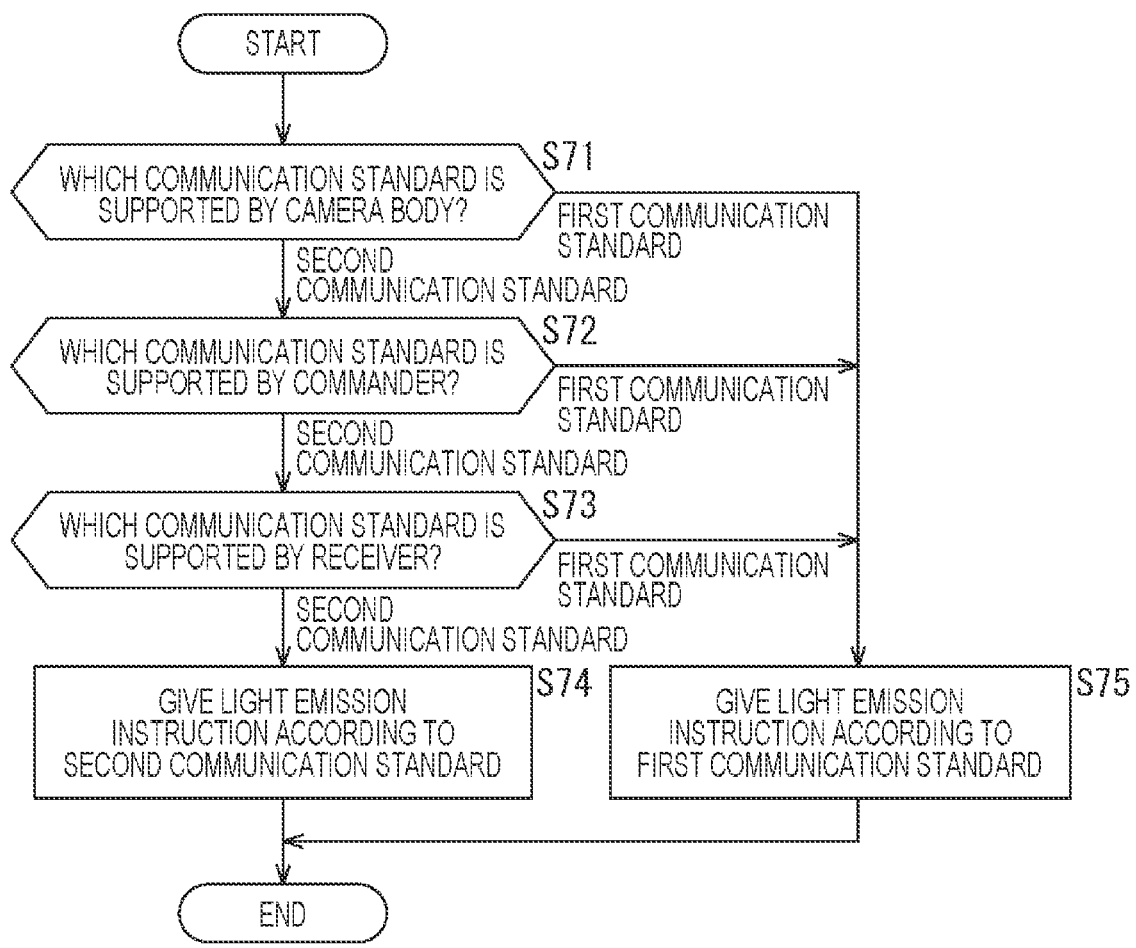

FIG. 10

| CAMERA | SET SUPPORT STATUS | | | | CONTROL VERSION | | | LIGHT EMISSION INSTRUCTION |
|---|---|---|---|---|---|---|---|---|
| | COMMANDER | RECEIVER 1 | RECEIVER 2 | COMMUNICATION BETWEEN CAMERA AND COMMANDER | COMMUNICATION BETWEEN COMMANDER AND RECEIVER 1 | COMMUNICATION BETWEEN COMMANDER AND RECEIVER 2 | | |
| FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | FIRST COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | FIRST COMMUNICATION STANDARD | SECOND COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | SECOND COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD |
| FIRST COMMUNICATION STANDARD | SECOND COMMUNICATION STANDARD | SECOND COMMUNICATION STANDARD | FIRST COMMUNICATION STANDARD | FIRST COMMUNICATION STANDARD | SECOND COMMUNICATION STANDARD | FIRST COMMUNICATION STANDARD | FIRST COMMUNICATION STANDARD |
| FIRST COMMUNICATION STANDARD | SECOND COMMUNICATION STANDARD | SECOND COMMUNICATION STANDARD | SECOND COMMUNICATION STANDARD | FIRST COMMUNICATION STANDARD | SECOND COMMUNICATION STANDARD | SECOND COMMUNICATION STANDARD | FIRST COMMUNICATION STANDARD |
| SECOND COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD |
| SECOND COMMUNICATION STANDARD | FIRST COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD |
| SECOND COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD | FIRST COMMUNICATION STANDARD |
| SECOND COMMUNICATION STANDARD | FIRST COMMUNICATION STANDARD | SECOND COMMUNICATION STANDARD | SECOND COMMUNICATION STANDARD | FIRST COMMUNICATION STANDARD | FIRST COMMUNICATION STANDARD | FIRST COMMUNICATION STANDARD | FIRST COMMUNICATION STANDARD |
| SECOND COMMUNICATION STANDARD | SECOND COMMUNICATION STANDARD | FIRST COMMUNICATION STANDARD | FIRST COMMUNICATION STANDARD | SECOND COMMUNICATION STANDARD | FIRST COMMUNICATION STANDARD | FIRST COMMUNICATION STANDARD | FIRST COMMUNICATION STANDARD |
| SECOND COMMUNICATION STANDARD | SECOND COMMUNICATION STANDARD | FIRST COMMUNICATION STANDARD | SECOND COMMUNICATION STANDARD | SECOND COMMUNICATION STANDARD | SECOND COMMUNICATION STANDARD | FIRST COMMUNICATION STANDARD | FIRST COMMUNICATION STANDARD |
| SECOND COMMUNICATION STANDARD | SECOND COMMUNICATION STANDARD | SECOND COMMUNICATION STANDARD | FIRST COMMUNICATION STANDARD | SECOND COMMUNICATION STANDARD | FIRST COMMUNICATION STANDARD | SECOND COMMUNICATION STANDARD | FIRST COMMUNICATION STANDARD |
| SECOND COMMUNICATION STANDARD | SECOND COMMUNICATION STANDARD | SECOND COMMUNICATION STANDARD | SECOND COMMUNICATION STANDARD | SECOND COMMUNICATION STANDARD | SECOND COMMUNICATION STANDARD | SECOND COMMUNICATION STANDARD | SECOND COMMUNICATION STANDARD |

IMAGING DEVICE AND CONTROL METHOD

CROSS REFERENCE TO RELATED APPLICATIONS

This application is a U.S. National Phase of International Patent Application No. PCT/JP2020/044799 filed on Dec. 2, 2020, which claims priority benefit of Japanese Patent Application No. JP 2019-226864 filed in the Japan Patent Office on Dec. 16, 2019. Each of the above-referenced applications is hereby incorporated herein by reference in its entirety.

TECHNICAL FIELD

The present disclosure relates to an imaging device, a control method, and a program, and more particularly, to an imaging device, a control method, and a program enabled to cope with various cases in which a plurality of communication standards is assumed to be mixed.

BACKGROUND ART

Conventionally, in an imaging system including a camera and an external flash, an external flash device is mounted on a mounting unit (so-called hot shoe) provided in an upper portion of a body of the camera, and imaging is performed to cause the external flash device to emit light in synchronization with imaging by the camera. Moreover, in the imaging system, a plurality of external flashes having a wireless communication function can be installed without being mounted on the camera, and light emission of those external flashes can be controlled via wireless communication.

For example, in Patent Document 1, an imaging device is disclosed that determines whether or not an external strobe mounted on a connection unit can communicate, and communicates with the external strobe.

CITATION LIST

Patent Document

Patent Document 1: Japanese Patent Application Laid-Open No. 2006-64763

SUMMARY OF THE INVENTION

Problems to be Solved by the Invention

Meanwhile, in recent years, there has been a demand for performance improvement of communication between the camera and the external flash, and a new communication standard that maintains compatibility with a conventional communication standard has been studied. Then, in a case where operation of the new communication standard is started, it is assumed that the conventional communication standard and the new communication standard are mixed, and it is necessary to cope with various cases.

The present disclosure has been made in view of such a situation, and makes it possible to cope with various cases in which a plurality of communication standards is assumed to be mixed.

Solutions to Problems

An imaging device of one aspect of the present disclosure includes: a communication unit that performs communication according to a first communication standard and a second communication standard; and a communication compatibility processing unit that performs communication compatibility processing necessary for maintaining communication compatibility in a case where an imaging system is assumed, the imaging system mixedly including a first external flash supporting only the first communication standard and a second external flash supporting both the first communication standard and the second communication standard.

A control method or a program for the imaging device of one aspect of the present disclosure includes: performing communication according to a first communication standard and a second communication standard; and performing communication compatibility processing necessary for maintaining communication compatibility in a case where an imaging system is assumed, the imaging system mixedly including a first external flash supporting only the first communication standard and a second external flash supporting both the first communication standard and the second communication standard.

In one aspect of the present disclosure, communication according to the first communication standard and the second communication standard is performed, and the communication compatibility processing necessary for maintaining the communication compatibility is performed in the case where the imaging system is assumed, the imaging system mixedly including the first external flash supporting only the first communication standard and the second external flash supporting both the first communication standard and the second communication standard.

BRIEF DESCRIPTION OF DRAWINGS

FIG. 9 is a flowchart explaining processing of determining a communication standard when a light emission instruction is given from the camera body to the commander and the receiver.

FIG. 10 is a diagram illustrating a correspondence relationship between a supported communication standard and a control version.

MODE FOR CARRYING OUT THE INVENTION

Hereinafter, a specific embodiment to which the present technology is applied will be described in detail with reference to the drawings.

Configuration Example of Imaging System

Figure 1:
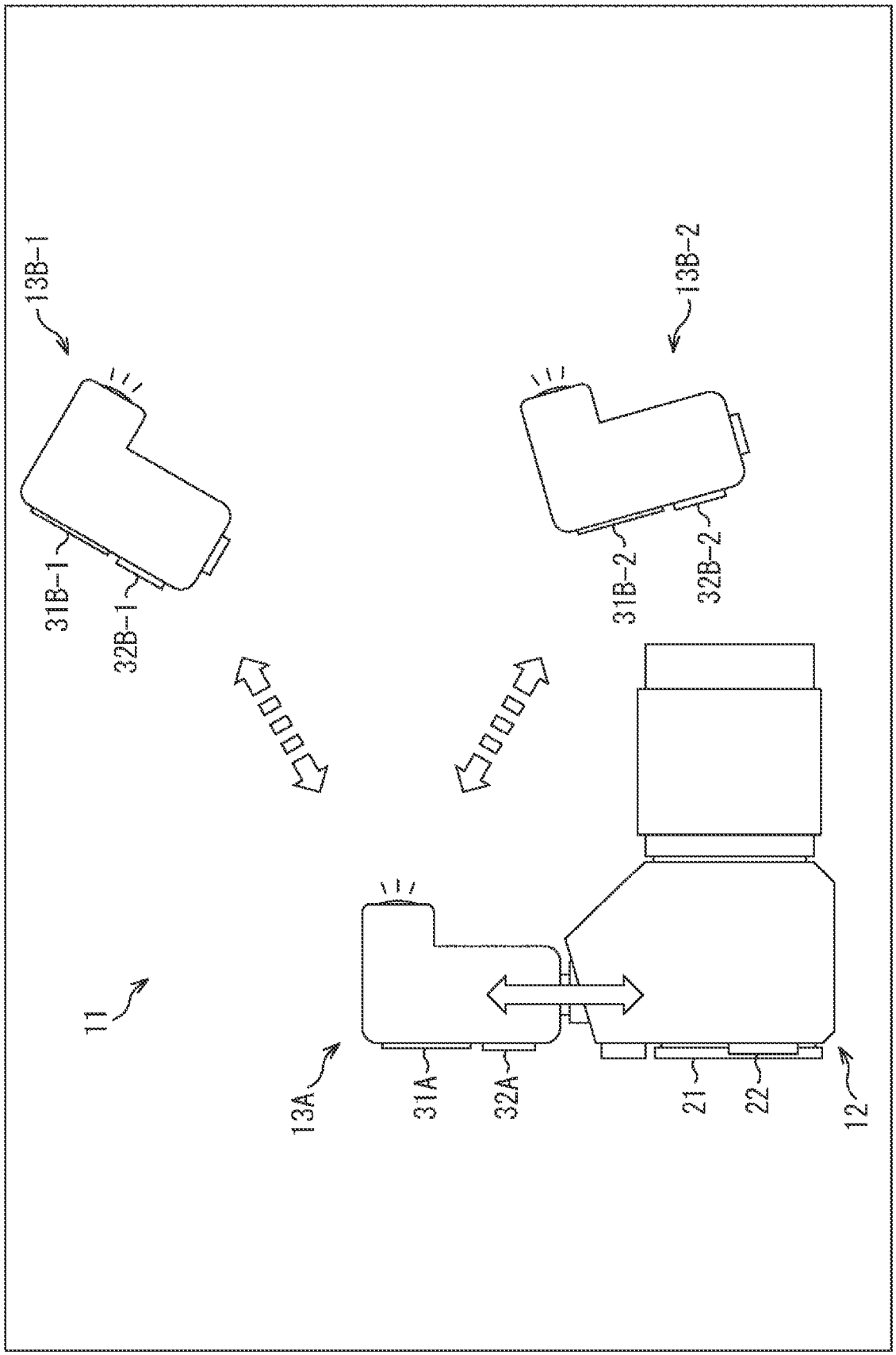
FIG. 1 is a diagram illustrating a configuration example of an embodiment of an imaging system to which the present technology is applied.

FIG. 1 is a diagram illustrating a configuration example of an embodiment of an imaging system to which the present technology is applied.

As illustrated in FIG. 1, an imaging system 11 includes a camera body 12, an external flash 13A mounted on the camera body 12, and external flashes 13B-1 and 13B-2 not mounted on the camera body 12. Note that the external flashes 13B-1 and 13B-2 are also configured to be mountable to the camera body 12, and in a case where it is not necessary to distinguish the external flash 13A and the external flashes 13B-1 and 13B-2, they each are simply referred to as an external flash 13 hereinafter, as appropriate.

The camera body 12 includes a display unit 21 and an operation unit 22. On the display unit 21, an image captured by the camera body 12, various setting screens, and the like are displayed. The operation unit 22 is provided with a shutter button operated when imaging is performed by the camera body 12, a setting button operated when various settings are made by using a setting screen displayed on the display unit 21, and the like.

The external flash 13 includes a display unit 31 and an operation unit 32. On the display unit 31, a setting screen for performing setting for the external flash 13 is displayed. The operation unit 32 is provided with a setting button to be operated when the setting for the external flash 13 is performed by using the setting screen displayed on the display unit 31.

Here, in the imaging system 11, the external flash 13A can communicate with the camera body 12 via an electrical contact of a mounting unit provided in the camera body 12. Meanwhile, in the imaging system 11, the external flashes 13B-1 and 13B-2 can communicate with the external flash 13A via wireless communication using radio waves. That is, the external flash 13A directly communicates with the camera body 12 to transmit a command to the external flashes 13B-1 and 13B-2, and the external flashes 13B-1 and 13B-2 can receive the command and operate.

Thus, hereinafter, the external flash 13A is also referred to as a commander 13A, and the external flashes 13B-1 and 13B-2 are also referred to as receivers 13B-1 and 13B-2, as appropriate.

Figure 2:
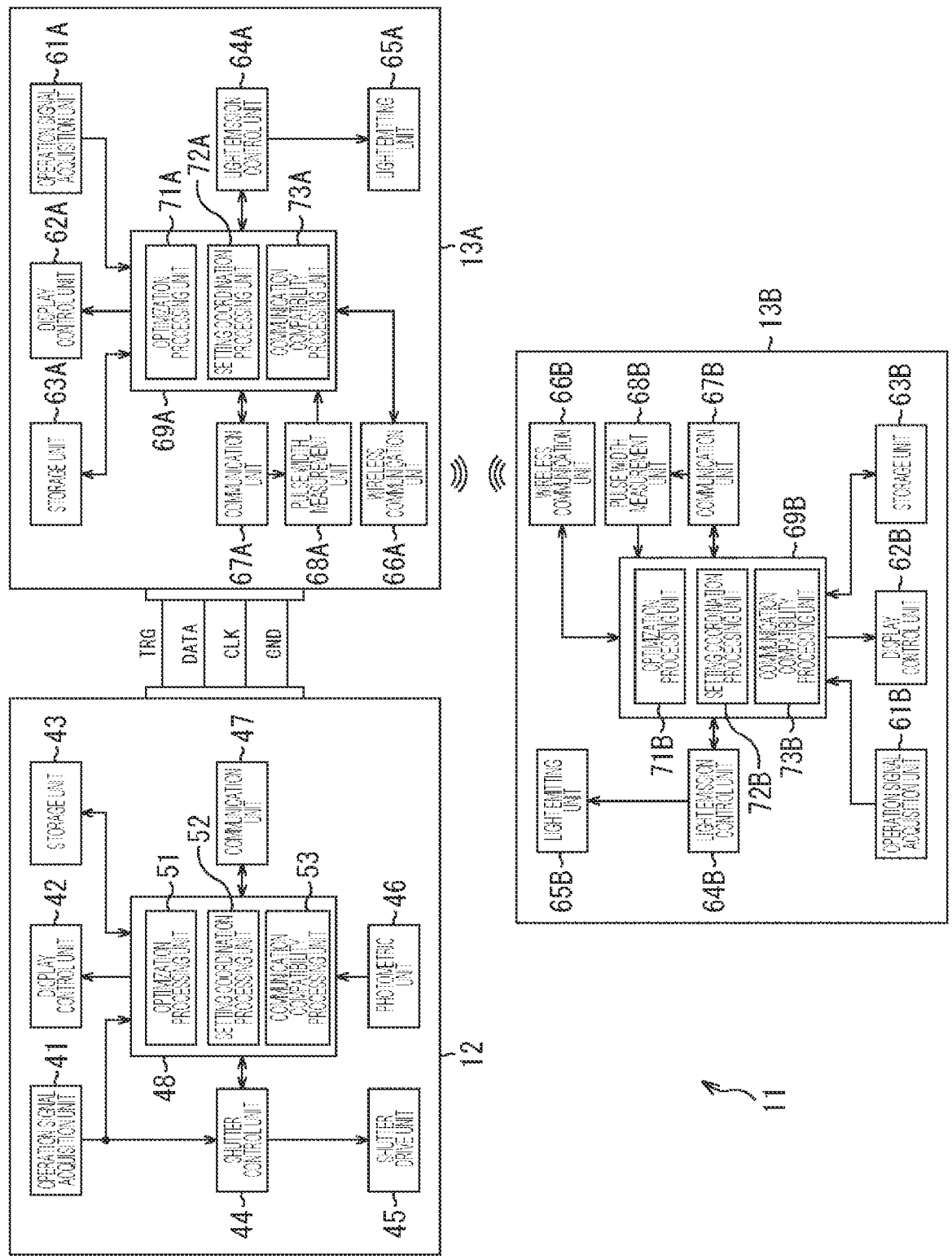
FIG. 2 is a block diagram illustrating a functional configuration example of the imaging system.

FIG. 2 is a block diagram illustrating a functional configuration example of the imaging system 11.

As illustrated in FIG. 2, in the imaging system 11, when the commander 13A is mounted on the camera body 12, the camera body 12 and the commander 13A are electrically connected together via four signal lines (TRG, DATA, CLK, GND), and communication can be performed. Furthermore, the commander 13A and a receiver 13B can perform communication by wireless communication.

The camera body 12 includes an operation signal acquisition unit 41, a display control unit 42, a storage unit 43, a shutter control unit 44, a shutter drive unit 45, a photometric unit 46, a communication unit 47, and a control unit 48.

When an operation on the operation unit 22 of FIG. 1 is performed, the operation signal acquisition unit 41 acquires an operation signal depending on the operation. For example, when an operation of fully pressing the shutter button of the operation unit 22 is performed, the operation signal acquisition unit 41 acquires an operation signal indicating that the shutter button is fully pressed, and supplies the operation signal to the shutter control unit 44 and the control unit 48. Furthermore, when an operation on the setting button of the operation unit 22 is performed, the operation signal acquisition unit 41 acquires an operation signal indicating that an instruction is given for making a setting associated with the setting button, and supplies the operation signal to a setting coordination processing unit 52 of the control unit 48.

The display control unit 42 controls display on the display unit 21 of FIG. 1, and can control display or non-display of the setting screen of the external flash 13 in accordance with, for example, setting coordination processing by the setting coordination processing unit 52 of the control unit 48.

The storage unit 43 stores various data necessary for control of the camera body 12 by the control unit 48. For example, the storage unit 43 can store setting information of the commander 13A acquired by the communication unit 47 communicating with the commander 13A, setting information of the receiver 13B acquired via the commander 13A, and the like. Here, various setting values such as a light emission mode and a light distribution type of the external flash 13, brightness of AF assist light, the number of times of test light emission, and the like are registered in the setting information of the external flash 13.

For example, when the operation signal indicating that the shutter button is fully pressed is supplied from the operation signal acquisition unit 41, the shutter control unit 44 performs control for the shutter drive unit 45 so that an imaging element (not illustrated) is exposed for an appropriate exposure time. At this time, the shutter control unit 44 can control a timing of exposing the imaging element, and the like in accordance with optimization processing by an optimization processing unit 51 of the control unit 48.

The shutter drive unit 45 drives a front curtain and a rear curtain (both are not illustrated) for adjusting the exposure time of the imaging element in accordance with control by the shutter control unit 44.

The photometric unit 46 includes, for example, an optical sensor or the like, measures an amount of light emitted to a subject by light emission of the external flash 13, and supplies a photometry result obtained by the measurement to the optimization processing unit 51 of the control unit 48.

The communication unit 47 communicates with the commander 13A via the four signal lines (TRG, DATA, CLK, GND) in accordance with control by the control unit 48. Here, in the imaging system 11, the communication unit 47 is assumed to perform communication according to two communication standards of a first communication standard and a second communication standard, and can perform communication by causing these communication standards to transition in accordance with communication compatibility processing by a communication compatibility processing unit 53 of the control unit 48. Note that, the second communication standard is compatible with the first communication standard, and a device supporting the second communication standard can perform communication according to the first communication standard. On the other hand, a device that supports only the first communication standard cannot perform communication according to the second communication standard.

The control unit 48 performs control necessary for performing imaging by the camera body 12. Furthermore, as illustrated, the control unit 48 includes the optimization processing unit 51, the setting coordination processing unit 52, and the communication compatibility processing unit 53.

For example, the optimization processing unit 51 recognizes a light emission preparation time of each of the external flashes 13 constituting the imaging system 11, and executes optimization processing necessary for optimizing a shutter time lag as the entire imaging system 11. Here, the light emission preparation time indicates a time from when the external flash 13 receives an instruction for light emission to when a light emission trigger can be received, and the shutter time lag indicates a time from the operation of fully pressing the shutter button to when imaging is actually performed. As described above, the optimization processing unit 51 executes the optimization processing, whereby making the shutter time lag shorter or constant can be achieved in the imaging system 11.

For example, the setting coordination processing unit 52 executes the setting coordination processing necessary for coordinating settings by respective operations in a case where an operation for performing setting for the external flash 13 is performed on the camera body 12 and in a case where the operation is performed on the external flash 13. As described above, the setting coordination processing unit 52 executes the setting coordination processing, whereby the setting for the external flash 13 can be implemented by the operation on the camera body 12 in the imaging system 11.

For example, in a case where it is assumed that the external flash 13 supporting the second communication standard and the external flash 13 supporting the first communication standard are mixed, the communication compatibility processing unit 53 executes the communication compatibility processing necessary for maintaining communication compatibility. As described above, the communication compatibility processing unit 53 executes the communication compatibility processing, whereby it is possible to cope with various cases in which the first communication standard and the second communication standard are assumed to be mixed, in the imaging system 11.

The commander 13A includes an operation signal acquisition unit 61A, a display control unit 62A, a storage unit 63A, a light emission control unit 64A, a light emitting unit 65A, a wireless communication unit 66A, a communication unit 67A, a pulse width measurement unit 68A, and a control unit 69A. Note that the receiver 13B is configured similarly to the commander 13A, and here, a configuration of the commander 13A will be described, and description of a configuration of the receiver 13B will be omitted.

When an operation on an operation unit 32A of FIG. 1 is performed, the operation signal acquisition unit 61A acquires an operation signal depending on the operation. For example, when an operation on the setting button of the operation unit 32A is performed, the operation signal acquisition unit 61A acquires an operation signal indicating that an instruction is given for making a setting associated with the setting button, and supplies the operation signal to the control unit 69A.

The display control unit 62A performs control to cause a display unit 31A of FIG. 1 to display a setting screen in accordance with control by the control unit 69A.

The storage unit 63A stores various data necessary for control of the commander 13A by the control unit 69A, setting information set in the commander 13A, and the like.

The light emission control unit 64A controls light emission of the light emitting unit 65A in accordance with a light emission trigger output from the camera body 12 in response to a full-press operation on the shutter button.

The light emitting unit 65A emits light in accordance with control by the light emission control unit 64A.

The wireless communication unit 66A performs wireless communication with a wireless communication unit 66B of the receiver 13B in accordance with control by the control unit 69A.

The communication unit 67A communicates with the camera body 12 via the four signal lines (TRG, DATA, CLK, GND) in accordance with control by the control unit 69A. Here, in the imaging system 11, the communication unit 67A is assumed to perform communication according to two communication standards of the first communication standard and the second communication standard.

The pulse width measurement unit 68A measures a pulse width of a signal transmitted at a predetermined clock cycle via the signal line CLK. Then, when a pulse width larger than a pulse width normally used in the second communication standard is measured, the pulse width measurement unit 68A detects that a cancellation signal that gives an instruction for canceling communication at that time is output from the camera body 12, and supplies a cancellation detection signal indicating the fact to an optimization processing unit 71A of the control unit 69A.

The control unit 69A performs control necessary for the commander 13A to emit light in synchronization with imaging by the camera body 12. Furthermore, as illustrated, the control unit 69A includes the optimization processing unit 71A, a setting coordination processing unit 72A, and a communication compatibility processing unit 73A.

The optimization processing unit 71A executes the optimization processing with the optimization processing unit 51 of the camera body 12.

The setting coordination processing unit 72A executes the setting coordination processing with the setting coordination processing unit 52 of the camera body 12.

The communication compatibility processing unit 73A executes the communication compatibility processing with the communication compatibility processing unit 53 of the camera body 12.

The imaging system 11 configured as described above can cope with various cases in which the first communication standard and the second communication standard are assumed to be mixed for the camera body 12 and the external flash 13.

For example, in the imaging system 11, as the communication compatibility processing executed by the communication compatibility processing unit 53 and the communication compatibility processing unit 73A, communication transition processing (see FIGS. 3 to 6) is performed of performing transition between communication according to the first communication standard and communication according to the second communication standard. Furthermore, in the imaging system 11, as the communication compatibility processing, control version determination processing (see FIGS. 7 to 10) is performed of determining a control version depending on communication standards supported by the camera body 12, the commander 13A, and the receivers 13B-1 and 13B-2, and communication is performed with the determined control version.

<Communication Transition Processing of First Communication Standard and Second Communication Standard>

With reference to FIGS. 3 to 6, a description will be given of communication transition processing of the first communication standard and the second communication standard between the camera body 12 and the external flash 13.

Figure 3:
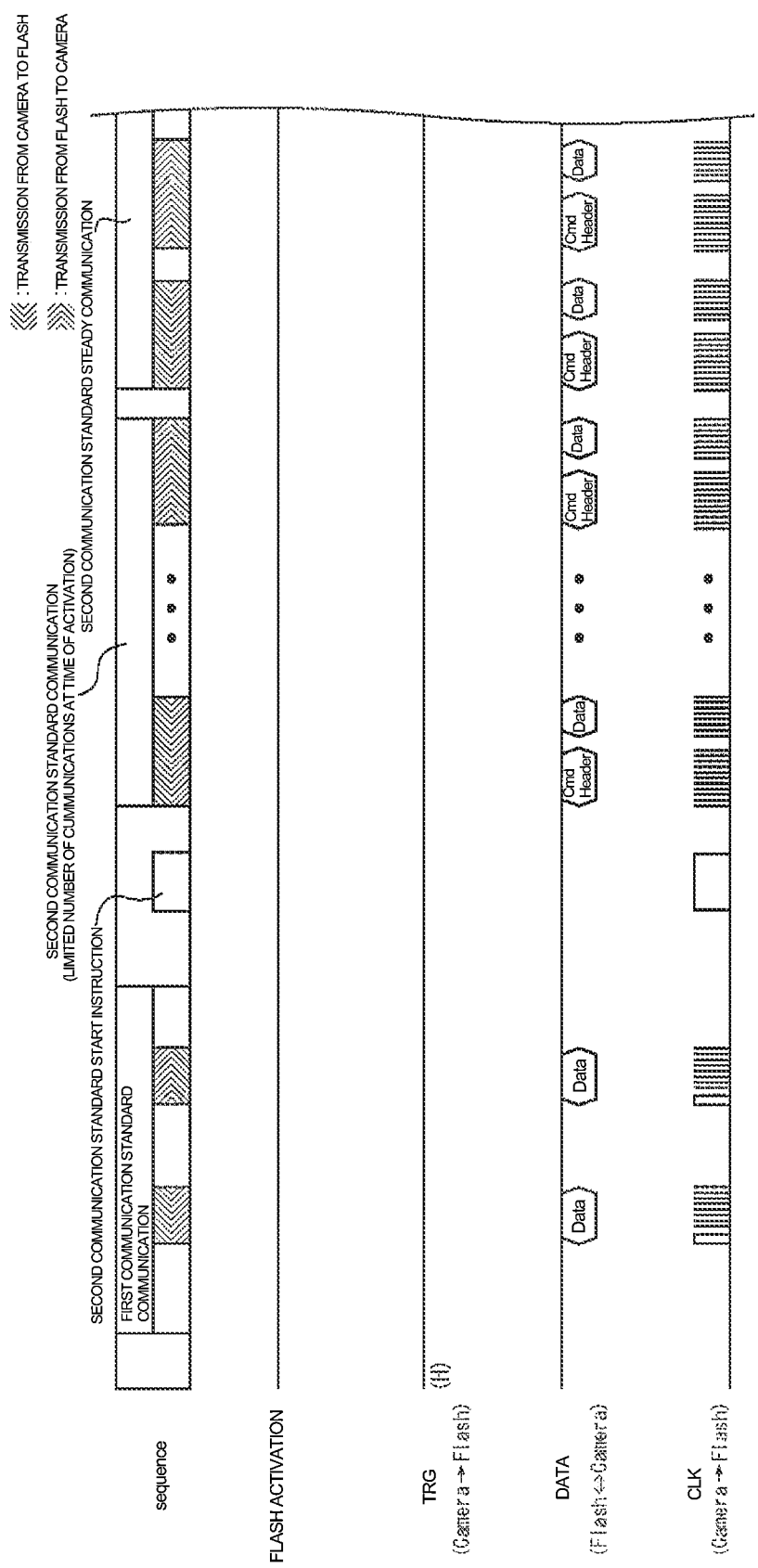
FIG. 3 is a diagram illustrating an example of a communication regulation when communication transition is performed from communication according to a first communication standard to communication according to a second communication standard.

FIG. 3 illustrates an example of a communication regulation when communication transition is performed from communication according to the first communication standard to communication according to the second communication standard.

For example, when the camera body 12 on which the external flash 13 is mounted is activated, first, communication between the camera body 12 and the external flash 13 is performed according to the first communication standard. For example, setting information of the camera body 12 is transmitted from the camera body 12 to the external flash 13, and in response to this, the setting information of the external flash 13 is transmitted from the external flash 13 to the camera body 12. At this time, in a case where the external flash 13 supports the second communication standard, setting information indicating that the second communication standard is supported is transmitted from the external flash 13 to the camera body 12.

Then, in response to transmission from the external flash 13 of the setting information indicating that the second communication standard is supported, the camera body 12 transmits, to the external flash 13, a second communication standard start instruction command that gives an instruction for starting communication according to the second communication standard. As a result, the camera body 12 and the external flash 13 transition from communication according to the first communication standard to communication according to the second communication standard.

Thereafter, a limited number of communications at the time of activation of the second communication standard are performed between the camera body 12 and the external flash 13 by communication according to the second communication standard. Note that, in the second communication standard, a command header (CmdHeader) gives an instruction which of the camera body 12 and the external flash 13 is to transmit data. Then, in accordance with the instruction, data transmission from the external flash 13 to the camera body 12 or data transmission from the camera body 12 to the external flash 13 is performed.

After such communication at the time of activation of the second communication standard is performed, steady communication of the second communication standard is performed between the camera body 12 and the external flash 13.

For example, in the second communication standard, information indicating a state of the external flash 13, information indicating a function of the external flash 13, information indicating a setting of the external flash 13, and the like are transmitted from the external flash 13 to the camera body 12. On the other hand, information indicating a state of the camera body 12 is transmitted from the camera body 12 to the external flash 13.

Figure 4:
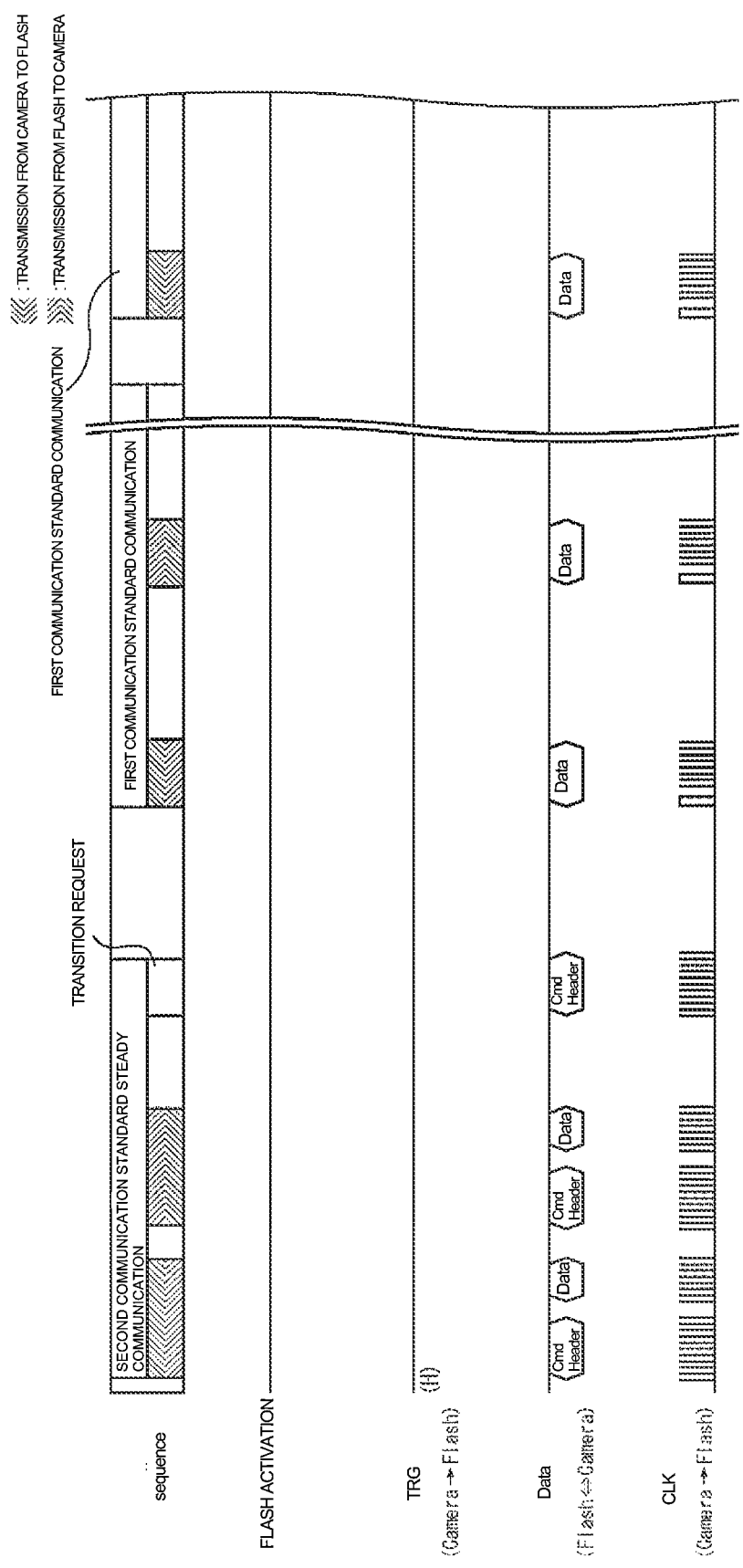
FIG. 4 is a diagram illustrating an example of a communication regulation when communication transition is performed from communication according to the second communication standard to communication according to the first communication standard according to a request from a camera body side.

FIG. 4 illustrates an example of a communication regulation when communication transition is performed from communication according to the second communication standard to communication according to the first communication standard according to a request from the camera body 12 side.

In a case where it is necessary to perform communication transition from communication according to the second communication standard to communication according to the first communication standard when the steady communication according to the second communication standard is performed as described with reference to FIG. 3, the camera body 12 transmits, to the external flash 13, a first communication standard transition request command for requesting transition to communication according to the first communication standard. As a result, the camera body 12 and the external flash 13 transition from communication according to the second communication standard to communication according to the first communication standard.

Thereafter, between the camera body 12 and the external flash 13, communication between the camera body 12 and the external flash 13 is continuously performed according to the first communication standard.

Figure 5:
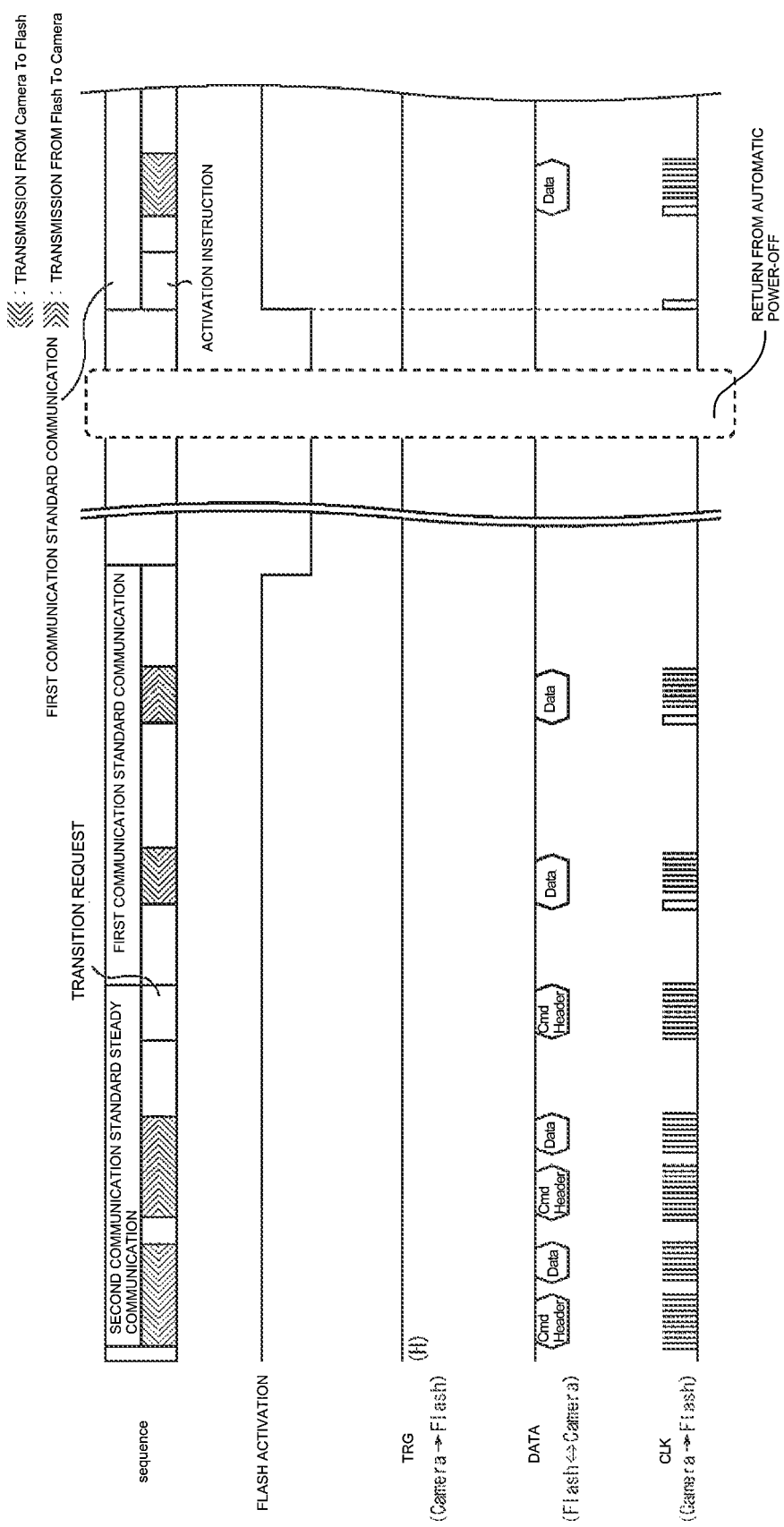
FIG. 5 is a diagram illustrating an example of communication regulations when automatic power-off is performed and when returning is performed from the automatic power-off.

FIG. 5 illustrates an example of communication regulations when the camera body 12 performs automatic power-off and when the camera body 12 returns from the automatic power-off.

For example, when a certain period elapses in a state where no operation is performed on the camera body 12, the camera body 12 is set to perform automatic power-off. At this time, in a case where the steady communication of the second communication standard is performed between the camera body 12 and the external flash 13, the camera body 12 transmits, to the external flash 13, the first communication standard transition request command for requesting transition to communication according to the first communication standard. As a result, the camera body 12 and the external flash 13 transition from communication according to the second communication standard to communication according to the first communication standard.

Then, communication by communication according to the first communication standard is established, and a command that gives an instruction for entering a power saving state is transmitted from the camera body 12 to the external flash 13. In response to this, the external flash 13 enters the power saving state.

Thereafter, when an operation is performed on the camera body 12 and the camera body 12 returns from the automatic power-off state, the camera body 12 sets the signal line CLK to the H level for a certain period to give an activation instruction to the external flash 13. In response to this, the external flash 13 returns from the power saving state.

Then, first, communication according to the first communication standard is performed, and then similarly to the description with reference to FIG. 3, transition is performed from communication according to the first communication standard to communication according to the second communication standard.

By transmission and reception of signals as illustrated in FIGS. 3 to 5, in the imaging system 11, it is possible to perform communication transition from communication according to the first communication standard to communication according to the second communication standard, and communication transition from communication according to the second communication standard to communication according to the first communication standard, between the camera body 12 and the external flash 13.

Furthermore, as illustrated, in the second communication standard, transmission of a header portion and transmission of a data portion (including a command and the like in addition to data) are separated. Then, the camera body 12 can give an instruction, by the header portion, for a transmission direction of the data transmitted by the data portion, that is, transmission from the camera body 12 to the external flash 13 or transmission from the external flash 13 to the camera body 12. Furthermore, the number of bytes of the data transmitted and received in the data portion can also be designated by the header portion.

Moreover, in the second communication standard, checksum data is inserted into the data transmitted and received between the camera body 12 and the external flash 13. As a result, the camera body 12 and the external flash 13 each can correct the communication error in a case where a communication error occurs in the received data. Thus, by performing communication according to the second communication standard, it is possible to prevent, for example, malfunction due to noise or the like.

Furthermore, in a case where a communication error occurs, the imaging system 11 can perform processing depending on the number of times of occurrence of the communication error. For example, in a case where the number of times of occurrence of the communication error is less than a predetermined value, processing is performed of discarding data and continuing communication according to the second communication standard, and in a case where the number of times of occurrence of the communication error is greater than or equal to the predetermined value, processing is performed of returning to communication according to the first communication standard. Then, processing is performed in which zero reset is performed by returning to the communication according to the first communication standard and communication between the camera body 12 and the external flash 13 is established by the communication according to the first communication standard, and then transition to communication in the second communication standard is performed again. As a result, the imaging system 11 can improve resistance to noise and recovery from a communication error.

Furthermore, as described with reference to FIG. 3, communication according to the first communication standard is always performed at the time of activation of the camera body 12. Then, by the communication according to the first communication standard, the setting information indicating that communication according to the second communication standard is supported is transmitted from the external flash 13 to the camera body 12, and a second communication standard start instruction is transmitted from the camera body 12 to the external flash 13.

Then, as described with reference to FIG. 5, a request is performed of turning off power of the camera body 12, and transitioning to communication according to the first communication standard to the external flash 13 from the camera body 12 before entering a sleep mode by automatic power-off. As a result, for example, even if the external flash 13 is attached or detached when the camera body 12 is in a sleep state, communication according to the first communication standard is performed at the time of activation of the camera body 12, and then transition is performed to communication according to the second communication standard. For this reason, in the imaging system 11, a communication error due to state discrepancy can be avoided, and a startup time can be shortened.

Here, in a case where the operation of fully pressing the shutter button is performed during transition between communication according to the first communication standard and communication according to the second communication standard, the communication compatibility processing unit 53 can prohibit a light emission instruction from being transmitted to the external flash 13. Note that, in this case, it can be enabled that light emission of the external flash 13 is not performed, but imaging is performed in accordance with control by the shutter control unit 44. That is, it is assumed that there is a case in which the light emission instruction is not performed normally during the transition between communication according to the first communication standard and communication according to the second communication standard, and in such a case, it is conceivable that better imaging can be performed when the light emission of the external flash 13 is not performed.

Furthermore, in the second communication standard, more information can be transmitted and received than in the first communication standard, and thus, in the imaging system 11, for example, notification can be performed of the maximum or minimum guide number transmitted from the external flash 13 to the camera body 12 with a finer setting value. Similarly, regarding the guide number of a light emission request transmitted from the camera body 12 to the external flash 13, notification of a fine setting value can also be performed. As a result, in the imaging system 11, light emission accuracy can be improved.

Figure 6:
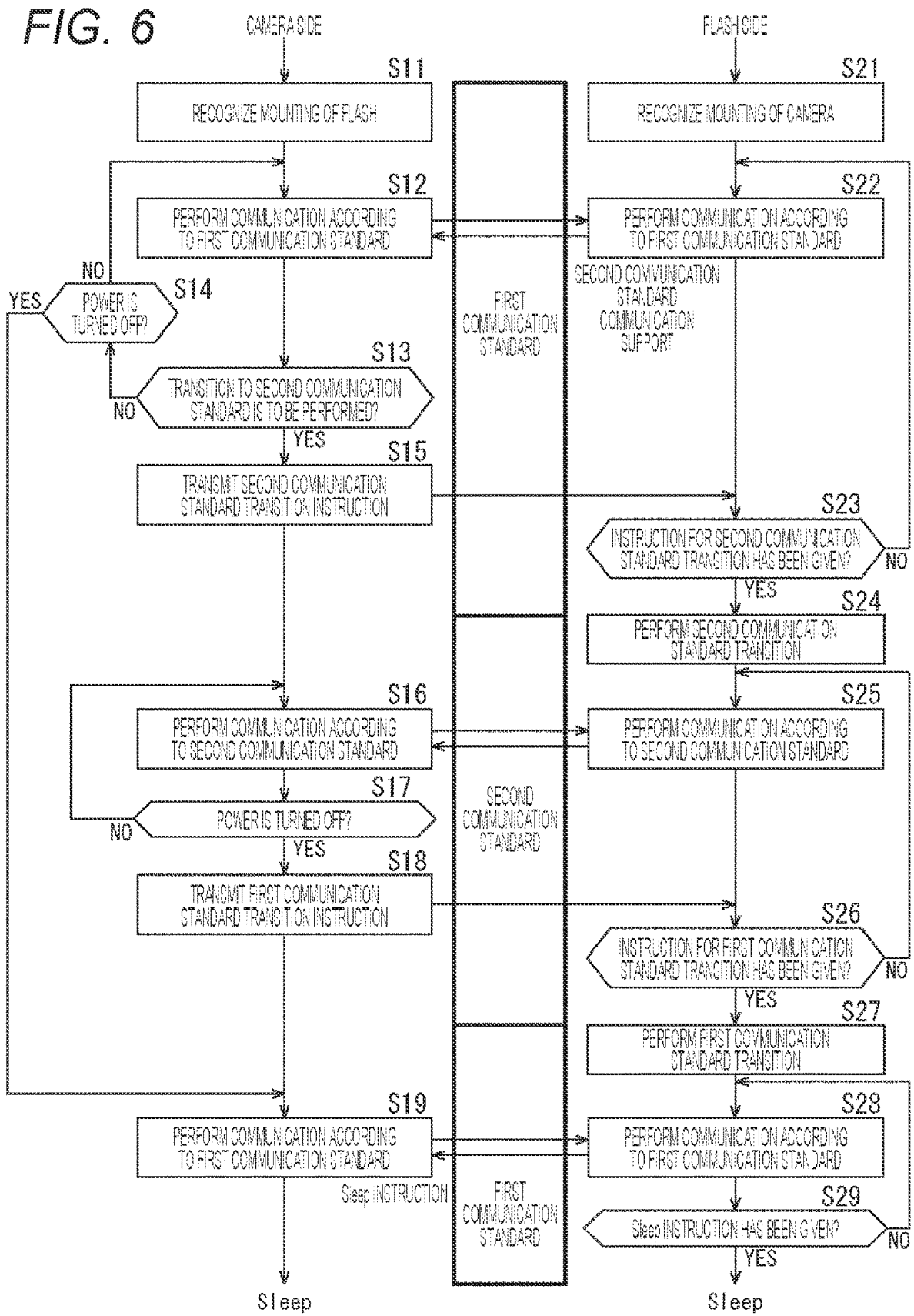
FIG. 6 is a flowchart explaining communication transition processing.

FIG. 6 is a flowchart explaining the communication transition processing.

For example, when a user mounts the external flash 13 on the camera body 12, the processing is started.

In the camera body 12, in step S11, the communication unit 47 recognizes mounting of the external flash 13 via four signal lines (TRG, DATA, CLK, GND). Similarly, in the external flash 13, in step S21, the communication unit 67A recognizes mounting of the camera body 12.

In the camera body 12, in step S12, the communication unit 47 communicates with the communication unit 67A of the external flash 13 according to the first communication standard. Similarly, in the external flash 13, in step S22, the communication unit 67A communicates with the communication unit 47 of the camera body 12 according to the first communication standard.

For example, in a case where the external flash 13 supports the second communication standard, setting information indicating that the second communication standard is supported is transmitted from the external flash 13 to the camera body 12, by communication in steps S12 and S22. Note that, in a case where the external flash 13 does not support the second communication standard, the setting information indicating that the second communication standard is supported is not transmitted.

In the camera body 12, in step S13, the communication compatibility processing unit 53 refers to the setting information acquired by the communication unit 47 in step S12, and determines whether or not to perform transition of communication with the external flash 13 to the second communication standard.

In step S13, in a case where the communication compatibility processing unit 53 determines not to perform transition of communication with the external flash 13 to the second communication standard, the processing proceeds to step S14. That is, in this case, the external flash 13 mounted on the camera body 12 does not support the second communication standard.

In the camera body 12, in step S14, the communication compatibility processing unit 53 determines whether or not an operation of turning off the power of the camera body 12 has been performed in accordance with an operation signal supplied from the operation signal acquisition unit 41.

In step S14, in a case where the communication compatibility processing unit 53 determines that the operation of turning off the power of the camera body 12 has not been performed, the processing returns to step S12, and communication according to the first communication standard is continuously performed. On the other hand, in step S14, in a case where the communication compatibility processing unit 53 of the camera body 12 determines that the operation of turning off the power of the camera body 12 has been performed, communication according to the second communication standard is not performed, and the processing proceeds to step S19.

On the other hand, in step S13, in a case where the communication compatibility processing unit 53 determines to perform transition of communication with the external flash 13 to the second communication standard, the processing proceeds to step S15. That is, in this case, the external flash 13 mounted on the camera body 12 supports the second communication standard.

In the camera body 12, in step S15, the communication compatibility processing unit 53 transmits, to the external flash 13 via the communication unit 47, a second communication standard transition instruction command that gives an instruction for transitioning to communication according to the second communication standard.

In the external flash 13, in step S23, the communication compatibility processing unit 73A determines whether or not the second communication standard transition instruction command has been transmitted from the camera body 12.

In step S23, in a case where the communication compatibility processing unit 73A determines that the second communication standard transition instruction command has not been transmitted from the camera body 12, the processing returns to step S22, and communication according to the first communication standard is continuously performed. On the other hand, in step S23, in a case where the communication compatibility processing unit 73A determines that the second communication standard transition instruction command has been transmitted from the camera body 12, the processing proceeds to step S24.

In the external flash 13, in step S24, the communication compatibility processing unit 73A performs processing for the communication unit 67A to transition to communication according to the second communication standard. As a result, communication between the camera body 12 and the external flash 13 transitions from the first communication standard to the second communication standard.

In the camera body 12, in step S16, the communication unit 47 communicates with the communication unit 67A of the external flash 13 by communication according to the second communication standard. Similarly, in the external flash 13, in step S25, the communication unit 67A communicates with the communication unit 47 of the camera body 12 by communication according to the second communication standard.

In the camera body 12, in step S17, the communication compatibility processing unit 53 determines whether or not the operation of turning off the power of the camera body 12 has been performed in accordance with the operation signal supplied from the operation signal acquisition unit 41.

In step S17, in a case where the communication compatibility processing unit 53 determines that the operation of turning off the power of the camera body 12 has not been performed, the processing returns to step S16, and communication according to the second communication standard is continuously performed. On the other hand, in step S17, in a case where the communication compatibility processing unit 53 of the camera body 12 determines that the operation of turning off the power of the camera body 12 has been performed, the processing proceeds to step S18.

In the camera body 12, in step S18, the communication compatibility processing unit 53 transmits, to the external flash 13 via the communication unit 47, a first communication standard transition instruction command that gives an instruction for transitioning to communication according to the first communication standard.

In the external flash 13, in step S26, the communication compatibility processing unit 73A determines whether or not the first communication standard transition instruction command has been transmitted from the camera body 12.

In step S26, in a case where the communication compatibility processing unit 73A determines that the first communication standard transition instruction command has not been transmitted from the camera body 12, the processing returns to step S25, and communication according to the second communication standard is continuously performed. On the other hand, in step S26, in a case where the communication compatibility processing unit 73A determines that the first communication standard transition instruction command has been transmitted from the camera body 12, the processing proceeds to step S27.

In the external flash 13, in step S27, the communication compatibility processing unit 73A performs processing for the communication unit 67A to transition to communication according to the first communication standard. As a result, communication between the camera body 12 and the external flash 13 transitions from the second communication standard to the first communication standard.

In the camera body 12, in step S19, the communication unit 47 communicates with the communication unit 67A of the external flash 13 according to the first communication standard. Similarly, in the external flash 13, in step S28, the communication unit 67A communicates with the communication unit 47 of the camera body 12 according to the first communication standard.

In the external flash 13, in step S29, the communication compatibility processing unit 73A determines whether or not a sleep instruction command that gives an instruction for entering the power saving state has been transmitted from the camera body 12, and communication according to the first communication standard is continuously performed until it is determined that the sleep instruction command has been transmitted.

For example, when the sleep instruction command is transmitted from the camera body 12 in the communication according to the first communication standard in step S19, the communication compatibility processing unit 73A determines that the sleep instruction command has been transmitted from the camera body 12 in step S29.

Then, after transmitting the sleep instruction command in step S19, the camera body 12 enters the sleep state. On the other hand, in a case where the communication compatibility processing unit 73A determines in step S29 that the sleep instruction command has been transmitted from the camera body 12, the external flash 13 enters the sleep state.

The communication transition processing as described above is performed, whereby the imaging system 11 can perform communication by transitioning between the first communication standard and the second communication standard.

<Control Version Determination Processing>

With reference to FIGS. 7 to 10, a description will be given of control version determination processing of determining a control version depending on the communication standard supported by the camera body 12, the commander 13A, and the receivers 13B-1 and 13B-2.

For example, the control version includes a combination of a communication standard between the camera body 12 and the commander 13A, a communication standard between the commander 13A and the receivers 13B-1 and 13B-2, and a communication standard when a light emission instruction is given from the camera body 12 to the commander 13A and the receivers 13B-1 and 13B-2.

Figure 7:
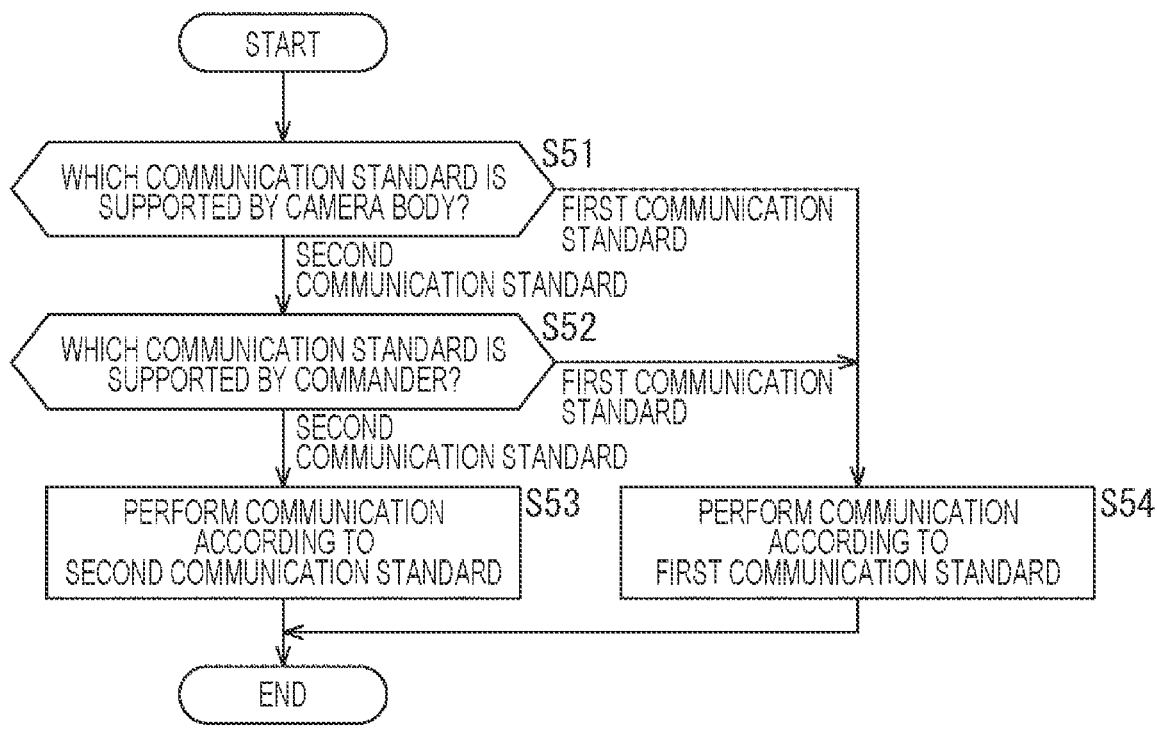
FIG. 7 is a flowchart for explaining processing of determining a communication standard between a camera body and a commander.

FIG. 7 is a flowchart explaining processing of determining the communication standard between the camera body 12 and the commander 13A.

In step S51, it is determined whether the communication standard supported by the camera body 12 is the first communication standard or the second communication standard.

In a case where it is determined in step S51 that the communication standard supported by the camera body 12 is the second communication standard, the processing proceeds to step S52.

In step S52, it is determined whether the communication standard supported by the commander 13A is the first communication standard or the second communication standard.

In a case where it is determined in step S52 that the communication standard supported by the commander 13A is the second communication standard, the processing proceeds to step S53. In this case, in step S53, the second communication standard is determined as the communication standard between the camera body 12 and the commander 13A.

On the other hand, in a case where it is determined in step S51 that the communication standard supported by the camera body 12 is the first communication standard, or in a case where it is determined in step S52 that the communication standard supported by the commander 13A is the first communication standard, the processing proceeds to step S54. In this case, in step S54, the first communication standard is determined as the communication standard between the camera body 12 and the commander 13A.

As described above, communication according to the second communication standard is performed only in a case where both the camera body 12 and the commander 13A support the second communication standard, and communication according to the first communication standard is performed in a case where either one of them does not support the second communication standard.

Figure 8:
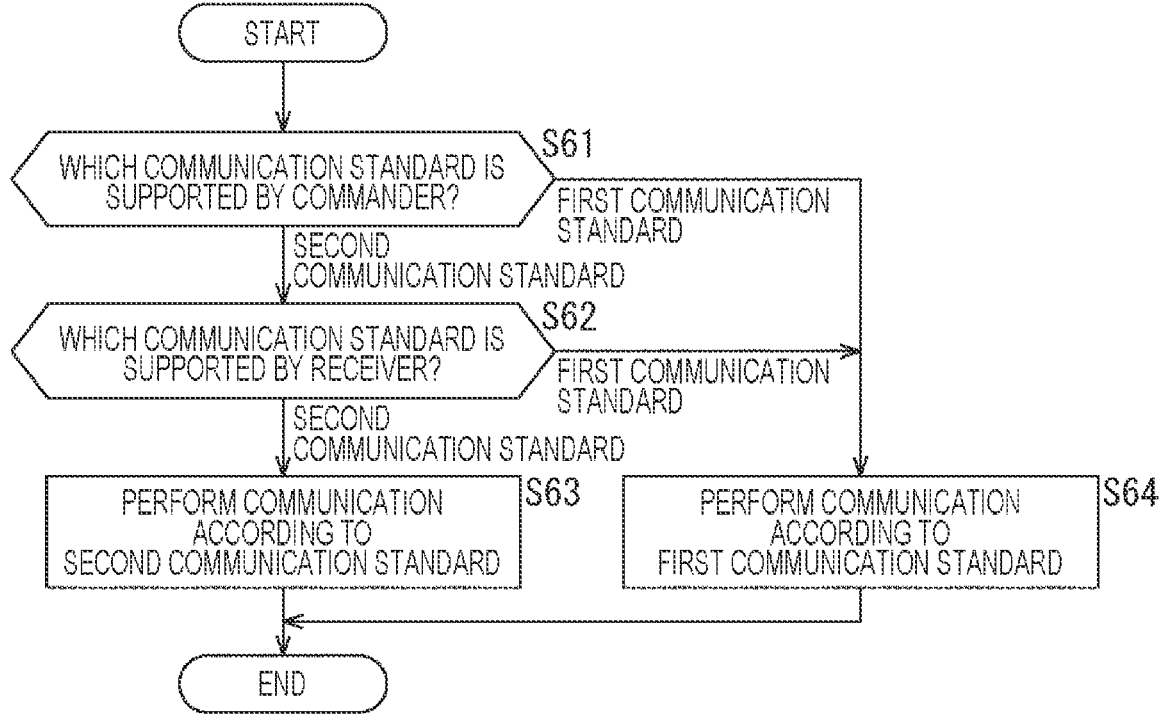
FIG. 8 is a flowchart explaining processing of determining a communication standard between a commander and a receiver.

FIG. 8 is a flowchart explaining processing of determining the communication standard between the commander 13A and the receivers 13B-1 and 13B-2. Note that processing of determining a communication standard between the commander 13A and the receiver 13B-1 and processing of determining a communication standard between the commander 13A and the receiver 13B-2 are performed similarly, and here, the processing of determining the communication standard between the commander 13A and the receiver 13B-1 will be described.

In step S61, it is determined whether the communication standard supported by the commander 13A is the first communication standard or the second communication standard.

In a case where it is determined in step S61 that the communication standard supported by the commander 13A is the second communication standard, the processing proceeds to step S62.

In step S62, it is determined whether the communication standard supported by the receiver 13B-1 is the first communication standard or the second communication standard.

In a case where it is determined in step S62 that the communication standard supported by the receiver 13B-1 is the second communication standard, the processing proceeds to step S63. In this case, in step S63, the second communication standard is determined as a communication standard between the camera body 12 and the receiver 13B-1.

On the other hand, in a case where it is determined in step S61 that the communication standard supported by the commander 13A is the first communication standard, or in a case where it is determined in step S62 that the communication standard supported by the receiver 13B-1 is the first communication standard, the processing proceeds to step S64. In this case, in step S64, the first communication standard is determined as the communication standard between the camera body 12 and the receiver 13B-1.

With similar processing, one of the first communication standard or the second communication standard is determined as a communication standard between the camera body 12 and the receiver 13B-2.

As described above, in a case where all of the commander 13A and the receivers 13B-1 and 13B-2 support the second communication standard, communication according to the second communication standard is performed between the commander 13A and the receivers 13B-1 and 13B-2. Furthermore, in a case where the commander 13A and the receiver 13B-1 support the second communication standard and the receiver 13B-2 does not support the second communication standard, communication according to the second communication standard is performed between the commander 13A and the receiver 13B-1, and communication according to the first communication standard is performed between the commander 13A and the receiver 13B-2.

Furthermore, in a case where the commander 13A and the receiver 13B-2 support the second communication standard and the receiver 13B-1 does not support the second communication standard, communication according to the first communication standard is performed between the commander 13A and the receiver 13B-1, and communication according to the second communication standard is performed between the commander 13A and the receiver 13B-2. Then, in a case where all of the commander 13A and the receivers 13B-1 and 13B-2 do not support the second communication standard, communication according to the first communication standard is performed between the commander 13A and the receivers 13B-1 and 13B-2.

FIG. 9 is a flowchart explaining processing of determining the communication standard when the light emission instruction is given from the camera body 12 to the commander 13A and the receivers 13B-1 and 13B-2.

In step S71, it is determined whether the communication standard supported by the camera body 12 is the first communication standard or the second communication standard.

In a case where it is determined in step S71 that the communication standard supported by the camera body 12 is the second communication standard, the processing proceeds to step S72.

In step S72, it is determined whether the communication standard supported by the commander 13A is the first communication standard or the second communication standard.

In a case where it is determined in step S72 that the communication standard supported by the commander 13A is the second communication standard, the processing proceeds to step S73.

In step S73, it is determined whether the communication standard supported by the receivers 13B-1 and 13B-2 is the first communication standard or the second communication standard.

In a case where it is determined in step S73 that the communication standard supported by both of the receivers 13B-1 and 13B-2 is the second communication standard, the processing proceeds to step S74. In this case, in step S74, the second communication standard is determined as the communication standard when the light emission instruction is given from the camera body 12 to the commander 13A and the receivers 13B-1 and 13B-2.

On the other hand, in a case where it is determined in step S71 that the communication standard supported by the camera body 12 is the first communication standard, and in a case where it is determined in step S72 that the communication standard supported by the commander 13A is the first communication standard, the processing proceeds to step S75. Furthermore, in a case where it is determined in step S73 that the communication standard supported by either one of the receiver 13B-1 or 13B-2 is the first communication standard, the processing proceeds to step S75. In this case, in step S75, the first communication standard is determined as the communication standard when the light emission instruction is given from the camera body 12 to the commander 13A and the receivers 13B-1 and 13B-2.

As described above, only in a case where all of the camera body 12, the commander 13A, and the receivers 13B-1 and 13B-2 support the second communication standard, the light emission instruction is performed by communication according to the second communication standard, and in a case where any one of them does not support the second communication standard, the light emission instruction is performed by communication according to the first communication standard.

With the processing as described above, the communication standard between the camera body 12 and the commander 13A, the communication standard between the commander 13A and the receivers 13B-1 and 13B-2, and the communication standard when the light emission instruction is given from the camera body 12 to the commander 13A and the receivers 13B-1 and 13B-2 are determined, and a control version including a combination thereof is used.

FIG. 10 illustrates a correspondence relationship between the communication standard supported by each of the camera body 12, the commander 13A, the receiver 13B-1, and the receiver 13B-2, and a control version.

For example, in a case where the commander 13A supporting the first communication standard (not supporting the second communication standard) is mounted on the camera body 12 supporting the second communication standard, communication between the camera body 12 and the commander 13A is continued in the first communication standard.

Furthermore, in a case where any one of a plurality of the external flashes 13 constituting the imaging system 11 is the external flash 13 supporting the first communication standard (not supporting the second communication standard), the camera body 12 gives a light emission instruction according to the first communication standard. That is, only in a case where all of the plurality of external flashes 13 constituting the imaging system 11 support the second communication standard, the camera body 12 can give a light emission instruction according to the second communication standard.

Furthermore, even if notification whether the light emission instruction is given according to the first communication standard or the second communication standard is not performed in advance from the camera body 12, the external flash 13 supporting the second communication standard can respond both light emission instructions.

Note that, in the imaging system 11, the communication between the camera body 12 and the commander 13A and the wireless communication between the commander 13A and the receiver 13B can be improved by separating protocols. As a result, for example, even if the receiver 13B before an update for supporting the second communication standard is performed is paired with the commander 13A, in a case where the commander 13A mounted on the camera body 12 supports the second communication standard, an operation on the commander 13A can be performed from the camera body 12. Furthermore, for the receiver 13B after the update for supporting the second communication standard is performed, an operation on the receiver 13B can be performed from the camera body 12. As described above, in the imaging system 11, it is possible to implement an operation on the external flash 13 while securing backward compatibility for the wireless communication between the commander 13A and the receiver 13B.

Note that, although the external flash 13 has been described in the present embodiment, the present technology is not limited to a flash light emitting device such as the external flash 13, and can be applied to other various external light emitting devices.

Configuration Example of Computer

Next, a series of processing steps (control method) described above can be performed by hardware or software. In a case where the series of processing steps is performed by software, a program constituting the software is installed in a general-purpose computer or the like.

Figure 11:
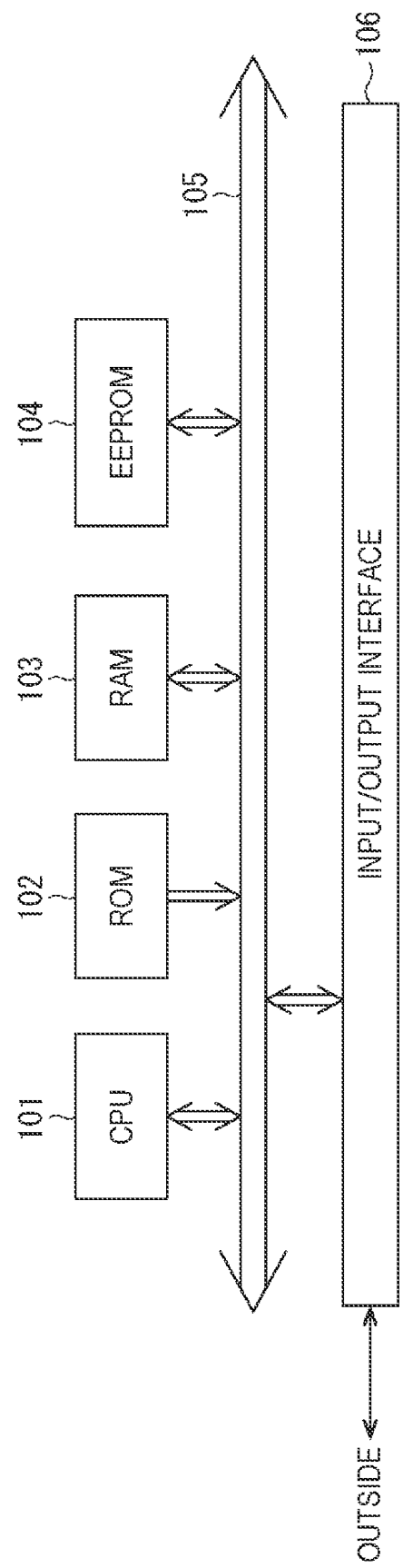
FIG. 11 is a block diagram illustrating a configuration example of an embodiment of a computer to which the present technology is applied.

FIG. 11 is a block diagram illustrating a configuration example of hardware of the computer that executes the above-described series of processing steps by the program.

In the computer, a central processing unit (CPU) 101, a read only memory (ROM) 102, a random access memory (RAM) 103, and an electronically erasable programmable read only memory (EEPROM) 104 are connected to each other by a bus 105. An input/output interface 106 is further connected to the bus 105, and the input/output interface 106 is connected to the outside.

In the computer configured as described above, for example, the CPU 101 loads the program stored in the ROM 102 and the EEPROM 104 to the RAM 103 via the bus 105 to execute the program, whereby the above-described series of processing steps. Furthermore, the program executed by the computer (CPU 101) can be written in the ROM 102 in advance, installed in the EEPROM 104 from the outside via the input/output interface 106, or updated.

Here, in the present specification, the processing performed by the computer in accordance with the program does not necessarily have to be performed chronologically in the order described as the flowchart. That is, the process performed by the computer in accordance with the program also includes processes executed in parallel or individually (for example, parallel process or process by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, for example, the configuration described as one device (or processing unit) may be divided and configured as a plurality of devices (or processing units). Conversely, configurations described as a plurality of devices (or processing units) in the above may be collectively configured as one device (or processing unit). Furthermore, configurations other than those described above may be added to the configuration of each device (or each processing unit), of course. Moreover, as long as the configuration and operation of the system as a whole are substantially the same, a part of the configuration of a certain device (or processing unit) may be included in the configuration of another device (or another processing unit).

Furthermore, for example, the present technology can adopt a configuration of cloud computing that shares one function in a plurality of devices via a network to process in cooperation.

Furthermore, for example, the program described above can be executed in any device. In that case, it is sufficient that the device has a necessary function (functional block, or the like) and can obtain necessary information.

Furthermore, for example, each step described in the above flowchart can be executed by sharing in a plurality of devices, other than being executed by one device. Moreover, in a case where a plurality of pieces of processing is included in one step, the plurality of pieces of processing included in the one step can be executed by sharing in a plurality of devices, other than being executed by one device. In other words, a plurality of pieces of processing included in one step can be executed as processing of a plurality of steps. Conversely, processing described as a plurality of steps can be executed collectively as one step.

Note that, in the program executed by the computer, pieces of processing of steps describing the program may be executed in chronological order along with the order described in this specification, or in parallel, or may be individually executed at necessary timing such as when each step is called. That is, as long as inconsistency does not occur, the processing of each step may be executed in an order different from the order described above. Moreover, the processing of the step describing the program may be executed in parallel with processing of another program, or may be executed in combination with the processing of the other program.

Note that, as long as inconsistency does not occur, each of a plurality of the present technologies described in this specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of any of the present technologies described above can be implemented in combination with another technology not described above.

Combination Example of Configurations

Note that, the present technology can also be configured as described below.

(1)
An imaging device including:
a communication unit that performs communication according to a first communication standard and a second communication standard; and
a communication compatibility processing unit that performs communication compatibility processing necessary for maintaining communication compatibility in a case where an imaging system is assumed, the imaging system mixedly including a first external flash supporting only the first communication standard and a second external flash supporting both the first communication standard and the second communication standard.

(2)
The imaging device according to (1), in which
the communication unit first communicates with the first external flash or the second external flash according to the first communication standard, and
the communication compatibility processing unit instructs the second external flash to transition from the first communication standard to the second communication standard in response to reception, by the communication unit according to the first communication standard, of compatibility information indicating that the second external flash supports the second communication standard.

(3)
The imaging device according to (2), in which
the communication compatibility processing unit instructs the second external flash to transition from the second communication standard to the first communication standard before the imaging device enters a power saving state.

(4)
The imaging device according to any of (1) to (3), in which
in the second communication standard, transmission is divided into transmission of a header portion and transmission of a data portion, and a transmission direction and the number of bytes of data to be transmitted and received in the data portion are designated by the header portion.

(5)
The imaging device according to (4), in which
in the second communication standard, checksum data is inserted into the data to be transmitted and received.

(6)
The imaging device according to (5), in which
when a communication error occurs in communication with the second external flash, the communication compatibility processing unit discards data and continues communication according to the second communication standard to perform processing in a case where the number of times of occurrence of the communication error is less than a predetermined value, and performs processing of returning to the first communication standard in a case where the number of times of occurrence of the communication error is greater than or equal to the predetermined value.

(7)
The imaging device according to (2), in which in a case where the first external flash is mounted on the imaging device, the communication compatibility processing unit continues communication while maintaining the first communication standard.

(8)
The imaging device according to any of (1) to (7), in which
in a case where the imaging system includes at least one external flash that is the first external flash, the communication compatibility processing unit gives a light emission instruction according to the first communication standard.

(9)

The imaging device according to any one of (1) to (8), in which in a case where an operation of fully pressing a shutter button is performed during transition between the first communication standard and the second communication standard, the communication compatibility processing unit prohibits a light emission instruction from being transmitted by the communication unit.

(10)

The imaging device according to any of (1) to (9), in which the second communication standard enables transmission and reception of more information than the first communication standard.

(11)

A control method including, by an imaging device:

performing communication according to a first communication standard and a second communication standard; and performing communication compatibility processing necessary for maintaining communication compatibility in a case where an imaging system is assumed, the imaging system mixedly including a first external flash supporting only the first communication standard and a second external flash supporting both the first communication standard and the second communication standard.

(12)

A program for causing a computer of an imaging device to execute processing including:

performing communication according to a first communication standard and a second communication standard; and performing communication compatibility processing necessary for maintaining communication compatibility in a case where an imaging system is assumed, the imaging system mixedly including a first external flash supporting only the first communication standard and a second external flash supporting both the first communication standard and the second communication standard.

Note that, the present embodiment is not limited to the embodiment described above, and various modifications are possible without departing from the scope of the present disclosure. Furthermore, the advantageous effects described in the present specification are merely examples and are not limited to them, and other effects may be included.

REFERENCE SIGNS LIST

11 Imaging system
12 Camera body
13 External flash
13A Commander
13B Receiver
21 Display unit
22 Operation unit
31 Display unit
32 Operation unit
41 Operation signal acquisition unit
42 Display control unit
43 Storage unit
44 Shutter control unit
45 Shutter drive unit
46 Photometric unit
47 Communication unit
48 Control unit
51 Optimization processing unit
52 Setting coordination processing unit
53 Communication compatibility processing unit
61 Operation signal acquisition unit
62 Display control unit
63 Storage unit
64 Light emission control unit
65 Light emitting unit
66 Wireless communication unit
67 Communication unit
68 Pulse width measurement unit
69 Control unit
71 Optimization processing unit
72 Setting coordination processing unit
73 Communication compatibility processing unit

The invention claimed is:

1. An imaging device, comprising:
a communication unit configured to communicate with an imaging system based on a first communication standard and a second communication standard, wherein
the imaging system includes a first external flash and a second external flash,
the first external flash supports only the first communication standard, and
the second external flash supports both the first communication standard and the second communication standard; and
a communication compatibility processing unit configured to perform communication compatibility processing operation to maintain communication compatibility in the imaging system, wherein
the communication unit is further configured to:
communicate with the second external flash based on the first communication standard; and
receive compatibility information from the second external flash in response to the communication with the second external flash, wherein
the compatibility information is received based on the first communication standard, and
the compatibility information indicates that the second external flash supports the second communication standard, and
the communication compatibility processing unit is further configured to transmit, via the communication unit, a second communication standard start instruction command to the second external flash, wherein
the second communication standard start instruction command is transmitted based on the first communication standard, and
the second communication standard start instruction command instructs the second external flash to transition from the first communication standard to the second communication standard.

2. The imaging device according to claim 1, wherein
the communication compatibility processing unit is further configured to instruct the second external flash to transition from the second communication standard to the first communication standard before the imaging device enters a power saving state.

3. The imaging device according to claim 1, wherein
in the second communication standard, transmission is divided into transmission of a header portion and transmission of a data portion, and
a transmission direction and a number of bytes of data to be transmitted and received in the data portion are designated by the header portion.

4. The imaging device according to claim 3, wherein
in the second communication standard, checksum data is inserted into the data to be transmitted and received.

5. The imaging device according to claim 4, wherein
based on an occurrence of a communication error in communication with the second external flash, the communication compatibility processing unit is further configured to:
discard data and continue the communication based on the second communication standard in a case where a number of times of the occurrence of the communication error is less than a certain value; and
return to the first communication standard in a case where the number of times of the occurrence of the communication error is greater than or equal to the certain value.

6. The imaging device according to claim 1, wherein
in a case where the first external flash is mounted on the imaging device, the communication compatibility processing unit is further configured to continue communication based on the first communication standard.

7. The imaging device according to claim 1, wherein
in a case where the imaging system includes at least one external flash, the communication compatibility processing unit is further configured to give a light emission instruction based on the first communication standard, and
the at least one external flash is the first external flash.

8. The imaging device according to claim 1, wherein
in a case where a shutter button is fully pressed during transition between the first communication standard and the second communication standard, the communication compatibility processing unit is further configured to prohibit transmission of a light emission instruction by the communication unit.

9. The imaging device according to claim 1, wherein
the second communication standard enables transmission and reception of more information than the first communication standard.

10. A control method, comprising:
by an imaging device:
communicating with an imaging system based on a first communication standard and a second communication standard, wherein
the imaging system includes a first external flash and a second external flash,
the first external flash supports only the first communication standard, and
the second external flash supports both the first communication standard and the second communication standard;
performing communication compatibility processing operation to maintain communication compatibility in the imaging system;
communicating with the second external flash based on the first communication standard;
receiving compatibility information from the second external flash in response to the communication with the second external flash, wherein
the compatibility information is received based on the first communication standard, and
the compatibility information indicates that the second external flash supports the second communication standard; and
transmitting a second communication standard start instruction command to the second external flash, wherein
the second communication standard start instruction command is transmitted based on the first communication standard, and
the second communication standard start instruction command instructs the second external flash to transition from the first communication standard to the second communication standard.

11. A non-transitory computer-readable medium having stored thereon computer-executable instructions that, when executed by a computer of an imaging device, cause the computer to execute operations, the operations comprising:
communicating with an imaging system based on a first communication standard and a second communication standard, wherein
the imaging system includes a first external flash and a second external flash,
the first external flash supports only the first communication standard, and
the second external flash supports both the first communication standard and the second communication standard;
performing communication compatibility processing operation to maintain communication compatibility in the imaging system;
communicating with the second external flash based on the first communication standard;
receiving compatibility information from the second external flash in response to the communication with the second external flash, wherein
the compatibility information is received based on the first communication standard, and
the compatibility information indicates that the second external flash supports the second communication standard; and
transmitting a second communication standard start instruction command to the second external flash, wherein
the second communication standard start instruction command is transmitted based on the first communication standard, and
the second communication standard start instruction command instructs the second external flash to transition from the first communication standard to the second communication standard.

* * * * *